(No Model.)
H. G. KLENGE.
ANIMAL TRAP.
No. 542,963. Patented July 16, 1895.
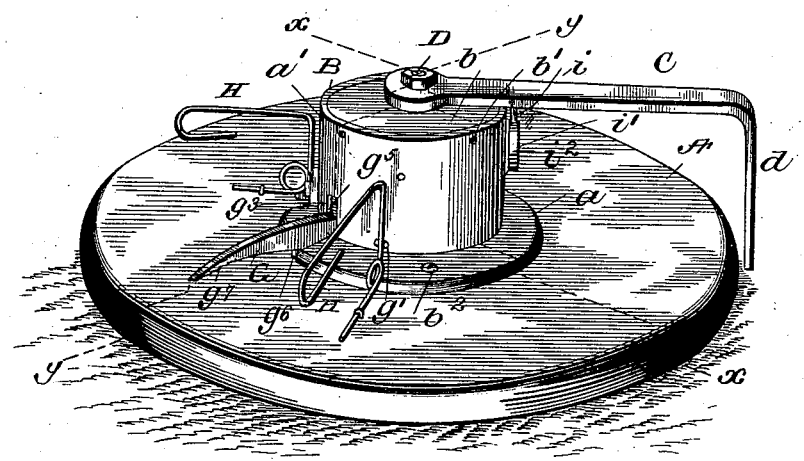
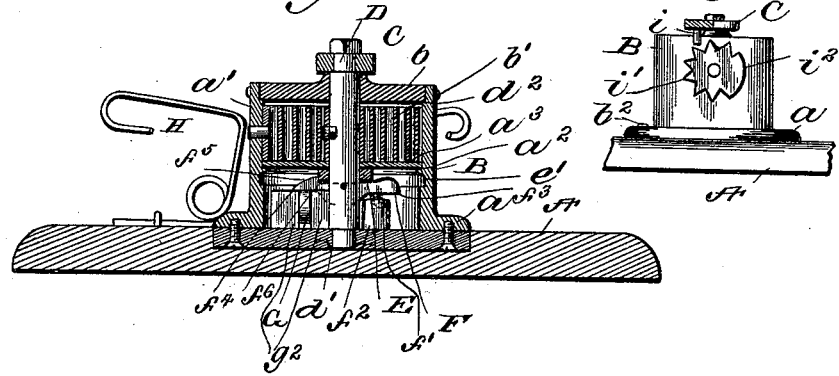
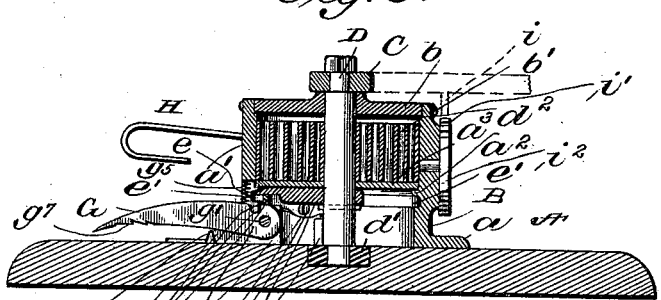
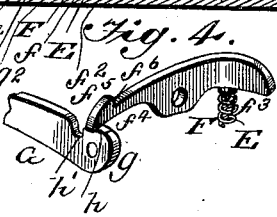
Witnesses
John Imine
Wm. S. Hodges.
Inventor
Henry G. Klenge,
By J. M. Hill.
Attorney

UNITED STATES PATENT OFFICE.

HENRY G. KLENZE, OF GREAT FALLS, MONTANA, ASSIGNOR OF TWO-THIRDS TO THOMAS C. SIMPSON AND OLIVER F. WADSWORTH, JR.

ANIMAL-TRAP.

SPECIFICATION forming part of Letters Patent No. 542,963, dated July 16, 1895.

Application filed March 13, 1895. Serial No. 541,580. (No model.)

*To all whom it may concern:*

Be it known that I, HENRY G. KLENZE, of Great Falls, in the county of Cascade and State of Montana, have invented certain new and useful Improvements in Animal-Traps; and I do hereby declare the following to be a full, clear, and exact description of the invention, such as will enable others skilled in the art to which it appertains to make and use the same.

This invention contemplates certain new and useful improvements in animal-traps, and is specially designed for exterminating rodents.

The object of the invention is to provide a trap by which a plurality of rodents may be killed—that is, to so construct a trap that it may be adjusted to operate any desired number of times and will be automatically reset after each operation. This object I accomplish by providing a trap with a single swinging arm designed to swing with considerable force across the point at which the rodent by which the trap is set in operation will be standing. This arm is connected at its inner end to a spring-operated shaft which is held locked at the end of each revolution of the arm. The bait is secured to a trip or trigger, the movement of which latter will free the shaft-holding lock and permit the arm to travel once in a circular plane. The shaft is locked and the trigger automatically reset at the end of each revolution. The traveling arm has an outer angular portion, which is designed to strike with great force against the rodent. The baited trigger is midway between two frames, between which the rodent must enter to reach the bait and thus be positioned in the line of travel of the arm.

The invention comprises the novel features of construction and also the detail combination and arrangement of parts, substantially as hereinafter fully set forth, and particularly pointed out in the claims.

In the accompanying drawings, Figure 1 is a view in perspective of my improved trap. Fig. 2 is a vertical sectional view on line $xx$, Fig. 1. Fig. 3 is a similar view on line $yy$, Fig. 2. Fig. 4 is a detail. Fig. 5 is a side view, parts being broken away.

Referring to the drawings, A designates a circular base board in the form of a flat disk.

B is a barrel or casing having a lower peripheral flange $a$ and an upper cylindrial portion $a'$, which is open at its top and provided with an inner flange $a^2$, on which rests a circular plate $a^3$. The upper end of the cylindrical portion is closed by a removable cap-plate $b$ held in position by screws $b'$. The barrel or casing B is secured to the base-board A by screws $b^2$ passed through flange $a$.

C is the swinging trap-arm, the outer end portion $d$ of which is curved and bent downwardly, so as to travel on a line concentric with but slightly from the periphery of said base-board. At its inner end this arm is fitted on the upper end of a shaft D, which is passed vertically through the barrel B and extends beyond the upper and lower plates $b$ and $a^3$, its lower end being supported by a cross-bar $d'$ attached to the under side of the barrel. Within the barrel is located a strong coil-spring $d^2$, which at its inner end is secured fast to the shaft D, while its outer end is connected to the inner surface of said barrel. The shaft D has secured thereto an arm E, the outer end $e$ of which is reduced and fits in an inner peripheral groove $e'$ of the barrel.

F is the locking-lever, which serves to hold the arm E and shaft D as against turning under the action of the coil-spring. This lever is bowed or curved to conform to an arc of the cylindrical portion of the barrel. It is fulcrumed on a screw $f$, supported by the barrel. A coil-spring $f'$, inclosed in an open-top boss $f^2$ of barrel B, bears against the lower edge of this lever at one end $f^3$ thereof and serves to normally hold the other end $f^4$ lowered. This latter end is reduced in width and is curved on its upper edge, as at $f^5$, and provided with a shoulder $f^6$, with which the reduced end of the arm E is designed to engage when the trap is set, the other end $f^3$ of said lever being lowered as against the action of its spring $f'$.

G is the trip or trigger, which consists of a curved arm having an inner cam-like end $g$, which is pivoted by a rod $g'$, fitted in openings in inwardly-projecting portions $g^2$ of the barrel or casing. This arm fits in a slot $g^3$ in the peripheral flange $a$, said slot also extending a short distance upwardly in the cylindrical portion $a'$ of the barrel. A coil-spring $g^5$, located on this extension of the slot, serves to normally hold said arm lowered, its outer end being just above the surface of the disk. A stop $g^6$ limits the downward movement of the trigger. This latter end is provided with teeth $g^7$, and against or around this end the bait is designed to be placed. The cam end of the lever has a flat portion $h$ and a groove or recess $h'$. When the trap is "set"—that is, the shaft D is turned and the spring $d^2$ wound, so that the shoulder $f^6$ of lever F— gagement with the shoulder $f^6$ of lever F— the trigger is forced downward by its spring $g^5$ and the lever rests on the flat portion $h$ of the trigger. The rodent pulling at the bait will move the outer end of the trigger upward, causing the groove or recess $h'$ of the inner end thereof to come beneath the shouldered end of lever F and permit said end to be lowered under the action of spring $f'$, thus lowering the shoulder out of the path of the arm E, whereby the shaft D will make one complete revolution under the agency of the spring $d^2$, the arm C being carried entirely around the disk A. The outer end of said arm will strike the rodent with great force and knock it from off the disk. As the arm E comes in contact with the spring-pressed end $f^3$ of lever F it will cause the lowering of said end and the elevation of the shouldered end into the line of travel of said arm E, and at the same time the spring $g^5$ will lower the trigger, so that its flat portion $h$ will hold the shouldered end of the lever elevated. Thus the trap is automatically reset. The number of operations of which the trap is capable depends entirely upon the extent to which the spring is wound and also the tension of the latter. It is customary in practice to employ a spring that will allow of at least eight operations without rewinding.

To insure the proper positioning of the rodent in the line of travel of the arm C, I preferably secure two flexible frames H to the disk on either side of the trigger, said frames being shown as consisting each of a continuous coiled and bent wire.

I have shown the spring-arm C provided with a short extension $i$ for engaging a toothed wheel $i'$, mounted on that side of the barrel at which said arm is at rest when held by the locking-lever. This wheel serves to indicate the number of times the trap has been operated after each winding. A segmental toothless portion $i^2$, when engaged by said extension, prevents unnecessary winding of the spring, indicates when rewinding is necessary, and prevents attempts at winding the spring in the wrong direction.

The advantages of my invention are apparent. It will be particularly noted that after the trap is once set and baited its further operation is automatic, and also that the swing-arm travels with such force and rapidity as to insure the killing of the rodent by which the trigger is operated.

I claim as my invention—

1. An animal trap having a base, a barrel or casing mounted thereon, a spring-impelled shaft mounted in said barrel and having a lower arm, a swinging arm connected to the upper end of said shaft, a locking lever normally holding said lower arm and a trip or trigger extending over said base and designed to release said locking-lever and lower arm, substantially as set forth.

2. An animal-trap having a base, a barrel or casing thereon, a spring-impelled shaft mounted in said barrel and having a lower arm, a swinging arm connected to the upper end of said shaft, a locking lever having a shoulder with which said lower arm is designed to engage, a trip or trigger engaging said lever, and means for returning said locking lever and trigger to their normal positions after said lever has been tripped and said shaft has completed one revolution, as set forth.

3. An animal trap having a base, a barrel or casing thereon, a shaft mounted in said barrel or casing, a lower arm carried by said shaft, a swinging arm connected to the upper end of said shaft, a spring in said barrel attached to said shaft, a locking device for holding said lower arm at the end of each revolution of said shaft, and a trip or trigger for releasing said locking device, as set forth.

4. An animal trap having a base, a barrel or casing thereon, a shaft mounted in said barrel or casing, a lower arm carried by said shaft, a swinging arm connected to the upper end of said shaft, a spring in said barrel attached to said shaft, a lever fulcrumed in said barrel having a shoulder at one end, a spring bearing against the other end of said lever for throwing said shouldered end out of the line of travel of said lower arm, and a trip or trigger for normally holding said shouldered end in the line of travel of said lower arm, substantially as set forth.

5. An animal trap having a base, a barrel or casing thereon, a shaft mounted in said barrel or casing, a lower arm carried by said shaft, a swinging arm connected to the upper end of said shaft, a spring in said barrel attached to said shaft, a lever fulcrumed in said barrel having a shoulder at one end, a spring bearing against the other end of said lever for throwing said shouldered end out of the line of travel of said lower arm, a trip or trigger having an inner cam-like end pivoted to said barrel and having a groove or recess and a flat portion, and a spring for normally holding said trip or trigger lowered, whereby when said trip or trigger is moved upward at its outer end said locking lever will lower in said groove or recess, freeing said lower arm, said locking lever being returned to position to be engaged by said lower arm when the latter contacts with the spring-pressed end of said lever, said trip or trigger being also returned to its normal position throwing its flat portion in engagement with said locking lever thereby holding the latter in place, substantially as set forth.

6. An animal trap having a circular base, a spring-impelled swinging arm centrally mounted over said base and having an outer bent or angular end designed to travel around the periphery of said base, a trip or trigger designed to hold a bait and extended over a portion of said base, and guides on either side of said trip or trigger, substantially as set forth.

7. An animal trap having a barrel, a spring impelled shaft mounted in said barrel, a swinging arm secured at its inner end to said shaft and provided with an extension, and an indicating wheel mounted on said barrel and having teeth designed to be engaged by said extension, whereby said wheel is partially rotated at each revolution of said arm, substantially as set forth.

8. An animal trap having a barrel, a spring impelled shaft mounted in said barrel, a swinging arm secured at its inner end to said shaft and provided with an extension, and an indicating wheel having a series of teeth on its periphery and also a toothless segmental portion, said teeth and segmental portion being designed to be engaged by said extension, whereby said wheel is partially rotated at each revolution of said arm, substantially as set forth.

9. The herein-described animal trap consisting of the circular base, the barrel centrally mounted thereon, a spring in said barrel, a vertical rotary shaft to which one end of said spring is connected, a swinging arm connected to said shaft having an outer curved or bent portion, a lower arm on said shaft, a pivoted locking lever having a shouldered end, a spring bearing against the other end of said lever, a trip or trigger having a cam-end provided with a flat portion and a groove or recess and having its outer end toothed, a spring bearing down on said trip or trigger, and the guide-frames secured to said base and between which said trip or trigger is located, substantially as set forth.

In testimony whereof I have signed this specification in the presence of two subscribing witnesses.

HENRY G. KLENZE.

Witnesses:
E. B. WEIRICK,
E. G. MACLAY.